United States Patent
Sullivan

(10) Patent No.: US 11,568,451 B2
(45) Date of Patent: Jan. 31, 2023

(54) DUAL-OPTIMIZATION OF TARGETED DIGITAL ASSETS UNDER VOLUME AND POSITION CONSTRAINTS

(71) Applicant: IRIS.TV, INC., Los Angeles, CA (US)

(72) Inventor: Thomas J. Sullivan, Los Angeles, CA (US)

(73) Assignee: IRIS.TV INC., Los Angeles, CA (US)

(*) Notice: Subject to any disclaimer, the term of this patent is extended or adjusted under 35 U.S.C. 154(b) by 0 days.

(21) Appl. No.: 16/809,527

(22) Filed: Mar. 4, 2020

(65) Prior Publication Data

US 2020/0286131 A1 Sep. 10, 2020

Related U.S. Application Data

(60) Provisional application No. 62/813,609, filed on Mar. 4, 2019.

(51) Int. Cl.
*G06Q 30/00* (2012.01)
*G06Q 30/02* (2012.01)

(52) U.S. Cl.
CPC ..... *G06Q 30/0276* (2013.01); *G06Q 30/0244* (2013.01); *G06Q 30/0246* (2013.01); *G06Q 30/0247* (2013.01); *G06Q 30/0271* (2013.01)

(58) Field of Classification Search
CPC .......... G06Q 30/0276; G06Q 30/0244; G06Q 30/0246; G06Q 30/0247; G06Q 30/0271
See application file for complete search history.

(56) References Cited

U.S. PATENT DOCUMENTS

| 10,642,580 | B1* | 5/2020 | Sempé Sosa | G06F 8/34 |
| 10,678,515 | B1* | 6/2020 | Edmonds | G06F 8/36 |
| 2007/0192863 | A1* | 8/2007 | Kapoor | H04L 9/40 726/23 |
| 2008/0262991 | A1* | 10/2008 | Kapoor | H04L 63/1441 706/20 |
| 2009/0164456 | A1* | 6/2009 | Slaney | G06F 16/5866 707/999.005 |
| 2010/0144383 | A1* | 6/2010 | Berger | G06Q 10/06 705/325 |
| 2010/0150122 | A1* | 6/2010 | Berger | H04W 4/029 370/328 |
| 2011/0238855 | A1* | 9/2011 | Korsunsky | H04L 63/1441 709/231 |
| 2018/0321356 | A1* | 11/2018 | Kulkarni | H04W 64/003 |
| 2018/0330293 | A1* | 11/2018 | Kulkarni | G06Q 10/0633 |

(Continued)

OTHER PUBLICATIONS

Shivakumar; Content_Infrastructure_and_Performance_Optimization; IEEE comp Society; pp. 352-373; 2017.*

(Continued)

*Primary Examiner* — Radu Andrei
(74) *Attorney, Agent, or Firm* — Wong & Rees LLP; Zhichong Gu

(57) ABSTRACT

Branded content, or a target asset, may be included in a set of ordered assets based on the category of an anchor asset. Fill rates, total views of the target asset, or a combination may be used in selecting an optimization strategy. A dual optimization may be used to reduce the burden of presentation based on historical yield rates and follow-on rates observed from category transition data. Serendipity may be incorporated in the process through use of a reserve pool of transitions.

20 Claims, 10 Drawing Sheets

(56) References Cited

U.S. PATENT DOCUMENTS

2018/0332434 A1* 11/2018 Kulkarni ................ H04L 43/10
2020/0211131 A1* 7/2020 Pangerl ................. G06Q 50/16

OTHER PUBLICATIONS

Zappini; Evolutionary_optimization_strategies_applied_to_wireless_fleet_management_in_emergency_scenarios; IEEE; 4 pages; 2015.*

* cited by examiner

Naïve approach, setting selection probabilities

| Beginning Category | Expected Starts (E) | Historical Yield Rate (Y) | Expected Fill (F=E*Y) | Historical Follow-on Rate beyond position k (R) | Expected Follow-ons (V=E*Y*R) | Equal Weight Net Score (S=F+V) | Dual Optimization Return (1 − S/E) |
|---|---|---|---|---|---|---|---|
| news | 100,000 | 0.20 | 20,000 | 0.4 | 8,000 | 28,000 | 0.28 |
| sports | 50,000 | 0.70 | 35,000 | 1.0 | 35,000 | 70,000 | 1.40 |
| television | 30,000 | 0.30 | 9,000 | 2.0 | 18,000 | 27,000 | 0.90 |
| food | 10,000 | 0.50 | 5,000 | 0.3 | 1,500 | 6,500 | 0.65 |
| science | 10,000 | 0.50 | 5,000 | 1.1 | 5,500 | 10,500 | 1.05 |
| politics | 100,000 | 0.0 | 0 | 0.0 | 0 | 0 | 0.00 |
| TOTAL | 300,000 | 0.247 | 74,000 | 4.0 | 58,000 | 132,000 | 0.44 |

Target Fill = 40,000

Naïve Expected Presentations = 40,000 / 0.247 = 161,943
Naïve Selection Probability = 161943 / 300,000 = 53.98%

FIG. 5A

Implementation to achieve fill rate, equal probability (53.98%)

| | Beginning Category | Expected Starts (E) | Historical Yield Rate (M) | Presentations | Expected Fills (F= E*Y) | Historical Follow-on Rate beyond position k (R) | Expected Follow-ons (M·F·R) | Equal Weight Net Score (S=F+V) | Return per Presentation |
|---|---|---|---|---|---|---|---|---|---|
| 502 | news | 100,000 | 0.20 | 53,981 | 10,797 | 0.4 | 4,319 | 15,115 | 0.28 |
| 504 | sports | 50,000 | 0.70 | 26,991 | 18,895 | 1.0 | 18,895 | 37,790 | 1.40 |
| 506 | television | 30,000 | 0.30 | 16,194 | 4,860 | 2.0 | 9,720 | 14,580 | 0.90 |
| 508 | food | 10,000 | 0.50 | 5,398 | 2,699 | 0.3 | 810 | 3,509 | 0.65 |
| 510 | science | 10,000 | 0.50 | 5,398 | 2,699 | 1.1 | 2,969 | 5,668 | 1.05 |
| 512 | politics | 100,000 | 0.0 | 53,981 | 0 | 0.0 | 0 | 0 | 0.00 |
| | TOTAL | 300,000 | 0.247 | 161,943 | 40,000 | 4.0 | 40,314 | 76,662 | 0.47 |

FIG. 5B

Prioritized by Expected Fill Rate to reduce presentation burden

| Beginning Category | Expected Starts (E) | Historical Yield Rate (Y) | Presentations (P) | Expected Fills (F = E × Y) | Probability of Selection (P/E) | Equal Weight Net Score (S = F + V) | Dual Optimization Return |
|---|---|---|---|---|---|---|---|
| ~~news~~ | 100,000 | 0.20 | 0 | 0 | 0 | | |
| sports | 50,000 | 0.70 | 50,000 | 35,000 | 100% | 70,000 | 1.40 |
| ~~television~~ | 30,000 | 0.30 | 0 | 0 | 0 | | |
| food | 10,000 | 0.50 | 5,000 | 2,500 | 50% | 3,250 | 0.65 |
| science | 10,000 | 0.50 | 5,000 | 2,500 | 50% | 5,500 | 1.05 |
| ~~politics~~ | 100,000 | 0.0 | 0 | 0 | 0 | | |
| TOTAL | 300,000 | 0.21 | 60,000 | 40,000 | | 78,750 | 1.31 |

Prioritized by Dual Objectives

| Beginning Category | Expected Starts (E) | Historical Yield Rate (Y) | Presentations (P) | Expected Fills (F = E x Y) | Probability of Selection (P/E) | Equal Weight Net Score (S = F+V) | Dual Optimization Return |
|---|---|---|---|---|---|---|---|
| ~~news~~ | 100,000 | 0.20 | 0 | 0 | 0 | | |
| sports | 50,000 | 0.70 | 50,000 | 35,000 | 100% | 70,000 | 1.40 |
| ~~television~~ | 30,000 | 0.30 | 0 | 0 | 0 | | |
| ~~food~~ | 10,000 | 0.50 | 0 | 0 | 0 | | |
| science | 10,000 | 0.50 | 10,000 | 5000 | 100% | 10,500 | 1.05 |
| ~~politics~~ | 100,000 | 0.0 | 0 | 0 | 0 | | |
| TOTAL | 300,000 | 0.21 | 60,000 | 40,000 | | 80,500 | 1.34 |

DUAL-OPTIMIZATION OF TARGETED DIGITAL ASSETS UNDER VOLUME AND POSITION CONSTRAINTS

PRIORITY CLAIM

This application claims benefit under 35 U.S.C. § 119(e) of Provisional Application No. 62/813,609, filed Mar. 4, 2019, the entire contents of which is hereby incorporated by reference as if fully set forth herein.

TECHNICAL FIELD

The present invention relates generally to data analytics, and in particular, to optimizing branded content campaigns.

BACKGROUND

The proliferation of digital content such as video, photographical, audio, textual, etc., made available to online consumers has exploded. Digital content providers have attempted to predict how users will consume digital content and, further, which digital content will be consumed by a particular user. Correlations between user interests and user consumption have been used to attempt to predict what digital content the user will be interested in consuming Other correlations between similar users or groups of users have also been used to attempt to make such predictions. Branded content, such as an advertisement, is often presented in conjunction with viewed content at random. Most approaches have been focused on the user's interests and have not shown much success.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF DRAWINGS

The present invention is illustrated by way of example, and not by way of limitation, in the figures of the accompanying drawings and in which like reference numerals refer to similar elements and in which:

FIGS. 5A-5D illustrate example data tables; and

DESCRIPTION OF EXAMPLE EMBODIMENTS

Figure 1A:
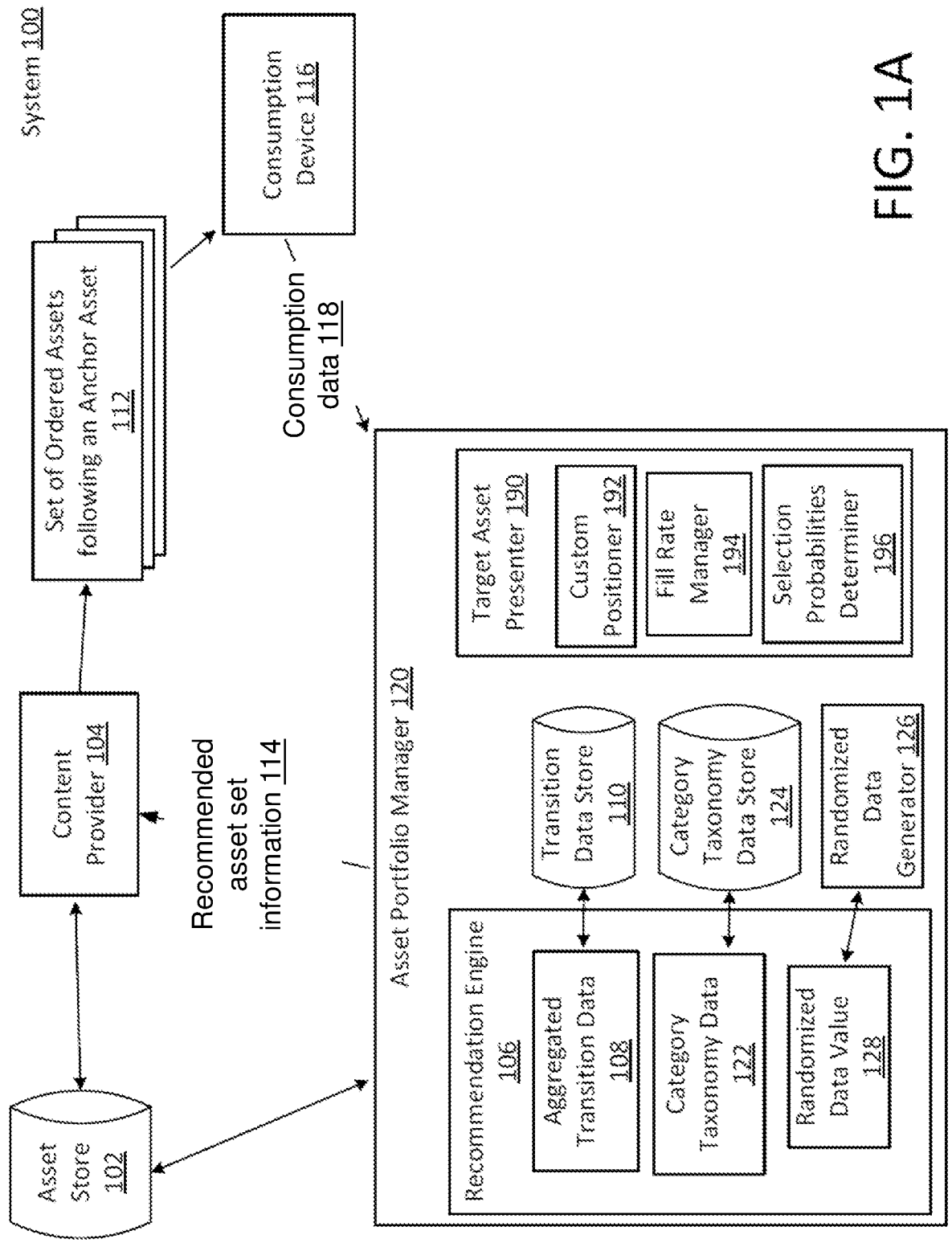
FIGS. 1A & 1B illustrate example high-level block diagrams, including an example asset portfolio manager.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1.0. General Overview
2.0. Functional Overview
3.0. Example Embodiments
4.0 Implementation Mechanism—Hardware Overview
5.0. Extensions and Alternatives

1.0 General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In an embodiment, assets in an asset portfolio are organized in a hierarchical taxonomy having category groups and sub groups. The hierarchical taxonomy of categories may be translated to a directed graph of nodes, or a tree, in which directed arcs are weighted based on the directionality of traversal. Similarity between two disparate categories is measured by the accumulated distance, or traversal path in the graph, from the starting category node to the terminal category node. In an embodiment, traversal down one level in the tree is weighted less than traversal up one level in the tree. The computed similarity metrics between pairs of nodes using taxonomy tree traversal are used by a recommendation engine in determining a set of recommended assets to present to a viewing user. The set of recommended assets is presented to users for consumption which is further monitored for accuracy.

In addition to the computed similarity metrics based on taxonomy tree traversal, a recommendation engine may analyze observed data from data consumption history of users in determining a recommended set of assets. For example, an aggregate data analysis of historical consumption may indicate a high success of completed views in transitions from a "sports" category to a "news" category of assets. This observed data metric of category transition history between pairs of nodes in the taxonomy tree may be used in conjunction with the similarity metric in a weighted linear combination to determine recommendation scores for the pairs of nodes in the taxonomy tree.

Thirdly, a randomized data value may be added to the weighted linear combination of the similarity metric and the observed historical data metric, in an embodiment, to encourage serendipity. Various stochastic methods may be used to generate the randomized data value, and the randomized data value may be weighted by administrators of the asset portfolio manager.

A targeted asset, or target asset, such as a branded content advertisement, may be included in a set of recommended assets that is presented for consumption in a particular position relative to an anchor asset for a determined number of users in a fixed time window. With a target asset selected for presentation at the time of the initial asset view, the entire recommendation list is constructed and, in one embodiment, will either include a full set of recommendations that does not include the targeted asset, if the user was not selected to be presented with it, or a full set of recommendations that does include the target asset shown in the specified position, assuming the user was selected to be presented with it. The presentation of the targeted asset in a set of ordered assets is optimized based on two criteria: a) observed historical yields and b) follow-on rates from each category to the target asset. For example, a target asset may be advertising a luxury boutique hotel. Categories such as "gardening" and "ideas" in a category taxonomy tree may have higher observed historical yields for the target asset, as an example. The asset portfolio manager may use this data in presenting the target asset in campaigns that start with anchor assets in those categories, for example, to minimize presentation of target assets (subject to achieving fill rate requirements) while also maximizing the total number of assets consumed. This enables the system to be more efficient in presenting advertisements that will be consumed in the form of branded content target assets.

The creation of a presentable ordered sequence is determined in advance of a user engagement of the sequence of assets based on the anchor asset using the position value k in relation to the anchor asset and number of users N consuming the target asset within the fixed time window of the campaign. Over time, the probability that a user will be presented with the target asset in position k is updated based on consumption data. Forecasts are updated based on the time remaining in the campaign and stored in a database accessible by the asset portfolio manager. Presentation of the target asset in campaigns may be customized based on an optimization strategy on fill rate, total views, or a combination.

Instead of the category-based approach, a precision approach may be used, in an embodiment, at initialization by assigning the same selection probability to all assets in the same category and then updating each asset as time passes to reflect observed asset-to-target asset transitions. In another embodiment, serendipity may be factored into a campaign by applying a reserve percentage to every experience, ignoring past data. Serendipity is factored in because the transition is forced to occur to satisfy the reserve percentage in order to determine the success rate of the transition based on observed data. This approach of creating a reserve pool adds serendipity because a successful transition may be found by chance of including the specified transition into the campaign. The optimization would be applied to experiences outside the reserve pool in order to avoid relying on weak data to optimize target asset inclusion.

Multi-asset campaigns may be applied as a vector of assets. First, returns for each target asset may be computed. These returns will differ only if the target assets belong to different categories. Then, the selection probabilities that result from the highest expected return are applied. The probabilities for remaining target assets are then recomputed because some or all of the available expected starts will be reserved for the first target assets. This process may be repeated until all target assets have been assigned selection probabilities.

Other embodiments include, without limitation, a non-transitory computer-readable medium that includes processor-executable instructions that enable a processing unit to implement one or more aspects of the disclosed methods as well as a system configured to implement one or more aspects of the disclosed methods. Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

FIG. 1A shows a high-level block diagram of a system 100 according to an embodiment of the present disclosure. One or more of the below-described techniques may be implemented in or involve one or more computer systems. The system comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components. The computing environment in FIG. 1A is not intended to suggest any limitation as to scope of use or functionality of described embodiments. As used in FIG. 1A, the process has been illustrated as an abstraction to a few functions.

System 100 may include one or more consumption devices 116, an asset portfolio manager 120, an asset store 102, and a content provider 104. An asset portfolio manager 120 may be implemented by a computing system. Consumption device 116 may be operated by one or more users (not illustrated), such as a person viewing (e.g., consuming) digital media assets in a playlist on a mobile device. Consumption data 118 is provided from the consumption device 116 to an asset portfolio manager 120, in an embodiment. A recommendation engine 106 operating within the asset portfolio manager 120 may use a weighted linear combination of aggregated transition data 108, category taxonomy data 122, and a randomized data value 128 to score each pair of nodes, or categories, in a category taxonomy tree. Based on the scores, the recommendation engine 106 determines recommended asset set information 114 to send to the content provider 104 that may include the actual assets for each set or pointers to the assets stored in the asset store 102. As a result, one or more recommended sets of ordered digital media assets 112 are presented to the consumption device 116. The techniques described above may repeat, in an embodiment, such that consumption data 118 is provided from the consumption device 116 from the presentation of the sets of ordered assets following an anchor asset 112 to an asset portfolio manager 120, in an embodiment. Consumption includes views, completed views, bounces, thumbs up or down action, and other user-generated feedback and/or content.

Consumption device 116 may include an interface, such as a physical interface, a graphical interface (e.g., a graphical user interface), or a combination thereof. A graphical interface may be generated by consumption device 116, received from an asset portfolio manager 120, a content provider 104, or a combination thereof. For example, the consumption device 116 may include an operating system and a web browser application on the operating system connected to the Internet. The web browser includes functionality to consume digital media assets provided by the content provider 104, such as a video streaming website or a music subscription service, for example. Additionally, an asset portfolio manager 104 may be integrated into a content provider 104 such that a playlist of recommended digital media assets 112 is presented in the graphical interface. The graphical interface may be updated or modified by consumption device 116, content provider 104, or asset portfolio manager 120 in response to interaction with the interface.

An asset portfolio manager 120 may include a transition data store 110, a category taxonomy data store 124, and a randomized data generator 126, in an embodiment. A transition data store 110 may include aggregated consumption data 118 between transitions of categories from a first viewed asset to a last viewed asset. A category taxonomy data store 124 includes a normalized similarity metric for all pairs of nodes in a given category taxonomy tree, or hierarchical directed graph, in an embodiment. A randomized data generator 126 uses various stochastic methods and/or models to generate a randomized data value for each pair of nodes in the category taxonomy data store 124.

FIG. 1A further illustrates the asset portfolio manager 120 including a target asset presenter 190 having a custom positioner 192, a fill rate manager 194, and a selection probabilities determiner 196. An anchor asset is the initial asset that has been selected and/or is being viewed by a user using the consumption device 116, in an embodiment. The target asset presenter 190 may specify a target asset be presented at a position k relative to the anchor asset. For example, an anchor asset about a sports event, such as the U.S. Figure Skating finals, may be consumed by a user operating the consumption device 116. A target asset, such as a branded content advertisement regarding a children's movie, may be set to a specific position in the set of ordered assets following the anchor asset 112, such as the $3^{rd}$ position. The custom positioner 192 is used to determine the position of the target asset.

Continuing the example, the fill rate manager 194 may be used to set a predetermined fill rate for the target asset in the campaign, meaning that the target asset be consumed in position k by at least N users in the fixed time window of the campaign. For example, the number of expected fills for the target asset in the campaign may be 40,000. The fill rate manager 194 is used to receive that information for each target asset in each campaign.

The selection probabilities determiner 196 may calculate selection probabilities based on available data at the asset portfolio manager 120. Referring to FIG. 5A, illustrating the example in a data table format, to achieve a target fill of 40,000, a number of naïve expected presentations is determined by taking the target fill divided by an average historical yield rate associated with a number of beginning category starts. For example, if the average historical yield rate, based on observed data, is 0.247 for different beginning category starts, such as news, sports, television, food, science, and politics, then the target fill of 40,000 divided by the average historical yield rate 0.247 is the naïve expected presentations (40,000/0.247=161,943). Then, the naïve selection probability may be determined based on the total number of expected starts (e.g., 300,000). The naïve selection probability may be determined by taking the naïve expected presentations (161,943) divided by the total number of expected starts (300,000), resulting in 53.98%. Thus, a selection probability has been determined based on the historical yield rate of beginning categories.

The set of ordered assets following an anchor asset 112 may be determined from the recommended asset set information 114 using the selection probability determined by the target asset presenter 190. Using other information, such as historical follow on rate beyond position k, meaning how often do users continue consuming assets after viewing the target asset within the set of ordered assets, a return on presentation may be calculated to highlight which categories may provide the best returns given the historical yield rate and historical follow-on rate per category.

Figure 1B:
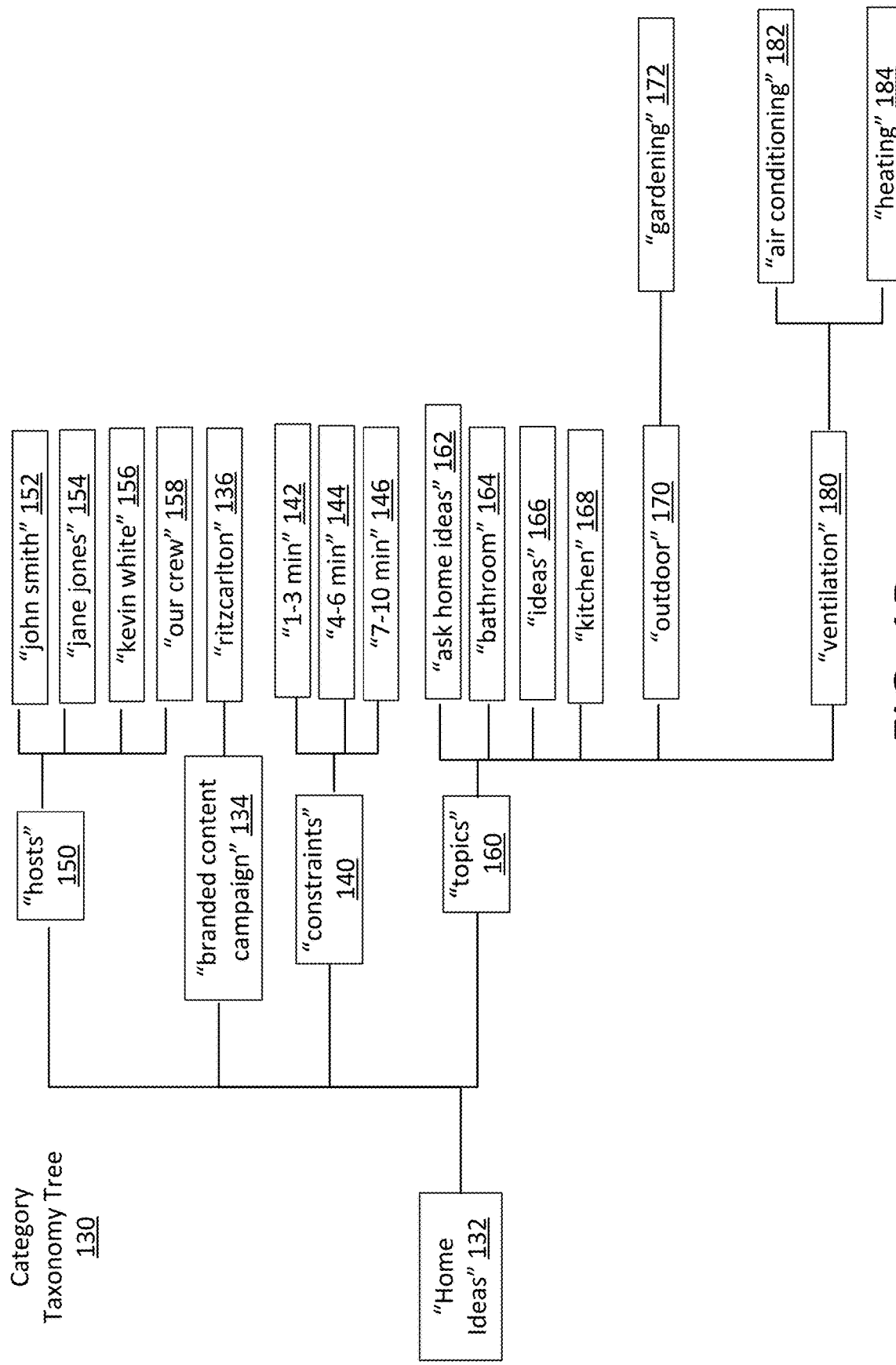

FIG. 1B illustrates a high-level block diagram according to an embodiment of the present disclosure. The category taxonomy data store 124 of FIG. 1A includes a traversal cost between a pair of nodes in the category taxonomy tree, indexed by each pair of nodes. An example of a category taxonomy tree 130 is shown in FIG. 1B. The category taxonomy tree 130 is for a television series on PBS called "Home Ideas" that include asset groups such as "hosts," "topics," "branded content campaigns," and "constraints," as an example. The primary node, "home ideas" 132, is at depth level one, and each asset group is a child node in the category transition tree at the depth level below the primary node, or depth level two. For each asset group, nodes and/or sub-groups may be included in the taxonomy. For example, for a "hosts" node 150, the nodes included in that asset group includes "john smith" node 152, "jane jones" node 154, "kevin white" node 156 and "our crew" node 158. For the "topics" asset group node 160, the included nodes are "ask home ideas" node 162, "bathroom" node 164, "ideas" node 166, "kitchen" node 168, and the sub-groups under "topics" asset group node 160 may include "outdoor" node 170 and "ventilation" node 180. The sub-group "outdoor" node 170 may include a "gardening" node 172 and the sub-group "ventilation" node 180 may include an "air conditioning" node 182 and "heating" node 184. The "gardening" node 172, "air conditioning" node 182, and "heating" node 184 are at depth level three.

In the category taxonomy tree 130 of "this old house," the "branded content campaign" asset group node 134 may include a branded content node such as a "ritzcarlton" node 136 to represent branded content assets associated with a RITZ-CARLTON brand. Further, a "constraints" asset group node 140 may be a placeholder node for sub-groups that are constrained in some way. For example, "constraints" may allow traversal into the sub-groupings under the "constraints" asset group node 140, such as a "1-3 min" node 142, a "4-6 min" node 144, and a "7-10 min" node 146, which corresponds to the length of the digital media clip. However, the directed graph may not allow traversal outside of the "constraints" sub-group. The directionality and traversal cost may be managed by administrators of the category taxonomy tree, in an embodiment. To prohibit traversal in a certain direction, weights in that direction may be artificially added to cause the traversal cost to become infinite, as an example.

Categories of assets are structured in a taxonomy tree as depicted in FIG. 1B to provide a structure that can measure how similar two categories are based on the accumulated traversal cost between the nodes representing the two categories. For example, a viewing user may initially view a first digital media asset, such as a video clip, about "gardening." The recommendation engine that determines what asset to show next may rely on traversal costs of the taxonomy tree to select an asset based on how close the category is to the first viewed category. Another clip about gardening would be the same category as the first viewed category. However, a clip about "ideas" is another category node separate from "gardening." The traversal cost from "gardening" node 172 to the "ideas" node 166 takes into account the directionality of traversal. In an embodiment, the administrators of the asset portfolio manager 120 may generate a constant traversal cost to move down a tree and a different constant traversal cost to move up the tree. An arc weight may be set to 1 between nodes, where an up weight may be set to 1.5 and a down weight may be set to 0.5, causing the distance to travel down the tree to be shortened whereas traveling up the tree is lengthened. Thus, the distance between "gardening" and "ideas" nodes would be the sum of the distances between "gardening" and "outdoor" (1*1.5), "outdoor" to "topics" (1*1.5), and "topics" to "ideas" (1*0.5), or 3.5. Different weights may be used as well as different formulas in various embodiments. The traversal costs of all pairs of nodes in the category tree would be normalized by dividing each cost by the traversal cost of the longest path between two nodes in the category tree. This provides a number between zero and one. This may provide one portion of a composite score used by the recommendation engine to rank a set of candidate assets for presentation to the viewing user operating the consumption device 116 of FIG. 1A. In this way, the set of recommended assets are based on selection of the first asset by the viewing user. The set of recommended assets reflect similarity with the first asset using traversal costs, historical transitions, and serendipity, computed, as a composite score, pairwise for all candidate assets. The pair of assets with larger traversal costs has a lower similarity, or "dissimilarity." Since the linear combination on similarity has been normalized to an inclusive range of numbers between zero (0) and one (1), or expressed as [0,1], the traversal contribution is similarity=1-dissimilarity. So, high traversal cost indicates low similarity, whereas low traversal cost indicates high similarity.

Over time, consumption data may be aggregated to track how successful a category transition was based on views completed over number of views. For example, over the past seven days, thirty-one views happened when a category transition between two nodes occurred, meaning that the viewing user selected to view the recommended digital asset. This category history transition data is stored in the transition data store 110. Data stored in the transition data store 110 may be weighted by a decay function that assigns less weight to data received after a certain time period, such as seven days. This time period may be adjusted manually by administrators of the asset portfolio manager 120, in an embodiment. The transition data may comprise another portion of the composite score used by the recommendation engine to rank candidate assets for presentation to a viewing user.

A third component of the composite score may include an element of randomness to ensure that potential new connections between categories may be explored. For example, through experimentation using randomness data values, a close connection between the RITZ-CARLTON brand and gardening may be discovered. This may be due to viewers looking at gardening digital media assets having a wealthier disposition than viewers looking at another category in the taxonomy, such as bathroom. By including a randomness value to the composite score, the asset portfolio manager 120 may learn new category transitions that have a high success rate of view completion.

Accordingly, embodiments are capable of recommending sets of digital media assets based on a weighted linear combination of category taxonomy similarity, historical category transitions, and randomness. Weights may be further determined by a recommendation engine 106 using machine learning techniques, administrator-determined weights, an aggregate of observed data between a pair of nodes in the category transition tree, and/or a combination thereof. Thus, embodiments provide a deeper understanding of connections between categories of assets, or nodes and the directed arc weights between them, and combined with historical category transition data and a randomized data value, the asset portfolio manager 120 generates a set of recommended assets that are likely going to be viewed by the consumption device 116. This is different from user-based interest recommendation engines because the data being tracked here is category transitions. Accordingly, the deeper understanding of connections between nodes illustrating category transitions provides, in aggregate and anonymized data, information that may better predict consumption of digital media assets. As such, embodiments provide better recommendations of digital media assets, greater user engagement, and deeper understanding of viewing user behavior based on category transitions.

Figure 2:
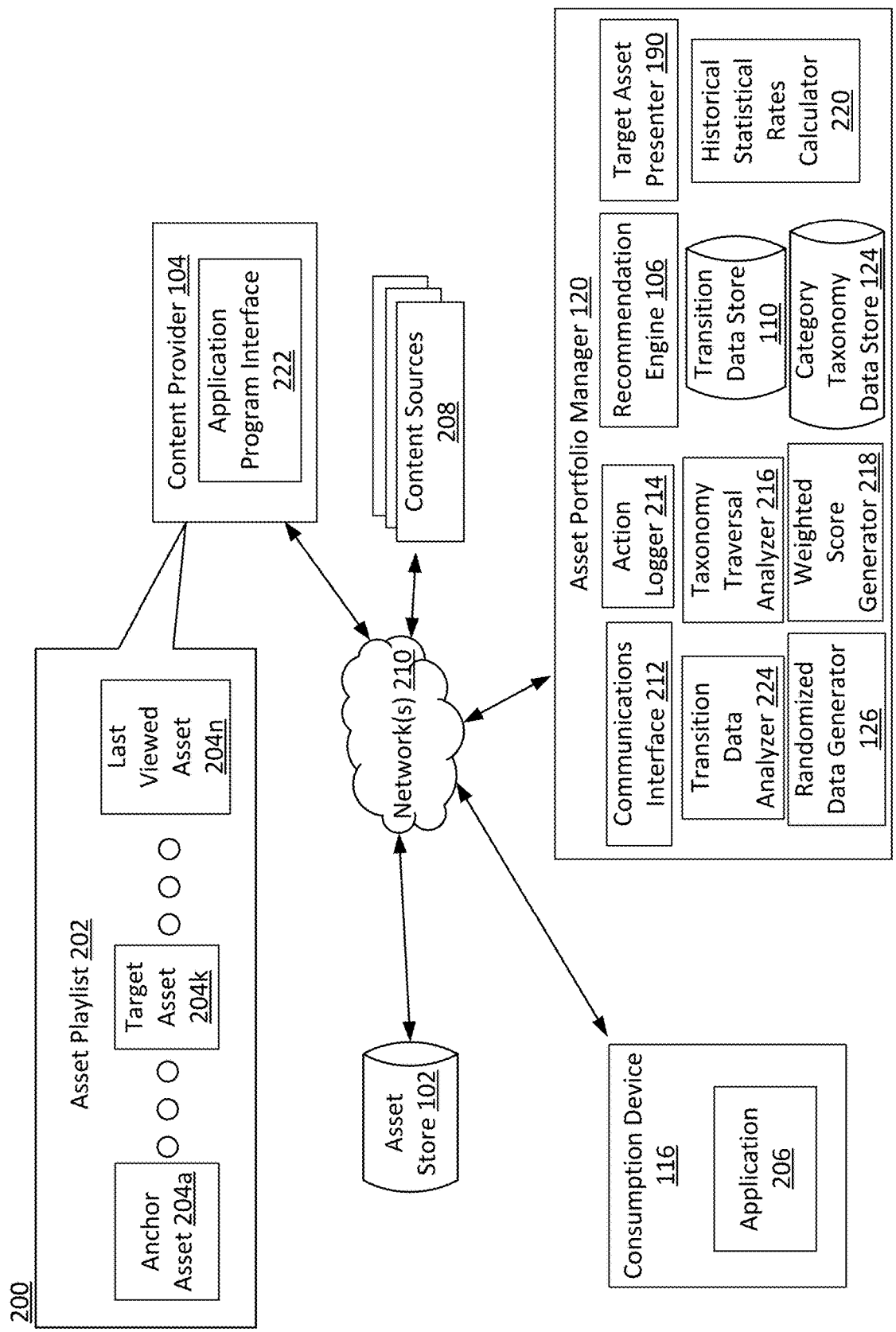
FIG. 2 illustrates an example high-level block diagram.

FIG. 2 illustrates an example high-level block diagram, in an embodiment.

System 200 includes the asset portfolio manager 120 of FIG. 1 (e.g., 120) connected to an asset store 102, a content provider 104, content sources 208, and one or more consumption devices 116 via network 210 as part of a service (e.g., a cloud service) or application. In some embodiments, consumption device 116 may provide access to one or more applications 206 ("app"). App 206 may enable a user to access and perform services provided by asset portfolio manager 120. In some embodiments, app 206 may enable a user, to view digital media assets in an asset playlist 202. In particular, app 206 logs the consumption of digital media assets, or "views," as represented in the asset playlist 202 comprising a series of viewed assets including a first viewed asset 204a through a last viewed asset 204n. The asset playlist 202 represents what was provided by the content provider 104 through an application program interface (API) 222.

FIG. 2 and the other figures use like reference numerals to identify like elements. A letter after a reference numeral, such as "204a," indicates that the text refers specifically to the element having that particular reference numeral. A reference numeral in the text without a following letter, such as "204," refers to any or all of the elements in the figures bearing that reference numeral (e.g. "204" in the text refers to reference numerals "204a" through "204n" in the figures). N-numbered viewed assets 204 are shown in FIG. 1 in order to simplify and clarify the description. Target asset 204k is located at position k within the asset playlist 202. Anchor asset 204a is the first asset of the asset playlist 202 that is determined by the user consuming the anchor asset 204a at the consumption device 116 through the application 206.

Content sources 208 may exist separately from an asset store 102, in an embodiment. For example, content sources 208 may include a paid subscription service streaming video content made accessible to the user through the application 206 on the consumption device 116. The asset store 102 may include links or pointers to the streaming video content, a type of digital media asset, stored at a content source 208. As another example, content sources 208 may include a freemium audio streaming service that provides music and/or other audio content through a website. Content sources 208 may include any repositories and/or content providers 104 that distribute digital media assets through one or more networks 210, such as the Internet.

Consumption device 116 and asset portfolio manager 120 may be communicatively connected via one or more communication networks 210. Examples of communication networks include, without restriction, the Internet, a wide area network (WAN), a local area network (LAN), an Ethernet network, a public or private network, a wired network, a wireless network, and the like, and combinations thereof.

Different communication protocols may be used to facilitate the communications including both wired and wireless protocols, such as IEEE 802.XX suite of protocols, TCP/IP, IPX, SAN, AppleTalk, Bluetooth®, and other protocols.

Asset portfolio manager 120 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up asset portfolio manager 120 may run any of a number of operating systems or a variety of additional server applications and/or mid-tier applications, such as HTTP servers, FTP servers, CGI servers, Java servers, database servers, and the like. Exemplary database servers include without limitation those commercially available from MONGODB, CASSANDRA, and the like. In one example, asset portfolio manager 120 may include a Iris.tv™ product or service, such as Asset IQ™ which provides automated data structuring of assets, Adaptive Stream™ which provides video personalization to surface relevant assets that continue engagement with viewing users, IRIS Vision™ which includes business intelligence and programming management functionality, and Campaign Manager™ which provides management of branded content and other prioritized or sponsored content. In various embodiments, asset portfolio manager 120 may be configured to run one or more services or software applications described in the foregoing disclosure. For example, asset portfolio manager 120 may correspond to a computing system for performing processing as described herein according to an embodiment of the present disclosure.

In some embodiments, asset portfolio manager 120 may be implemented as an enterprise computing system or a cloud computing system comprising one or more computers and/or servers that may include those described above. Asset portfolio manager 120 may include several subsystems and/or modules, including some, which may not be shown. For example, asset portfolio manager 120 may include a communications interface 212, an action logger 214, a recommendation engine 106, a transition data analyzer 224, a taxonomy traversal analyzer 216, a transition data store 110, a randomized data generator 126, a weighted score generator 218, a category taxonomy data store 124, a target asset presenter 190, and a historical statistical rates calculator 220. Asset portfolio manager 120 may have more or fewer subsystems and/or modules than shown in the figure, may combine two or more subsystems and/or modules, or may have a different configuration or arrangement of subsystems and/or modules. Subsystems and modules of asset portfolio manager 120 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, asset portfolio manager 120 may also provide other services or software applications that can include non-virtual and virtual environments. In some embodiments, these services may be offered as web-based or cloud services or under a Software as a Service (SaaS) model to the users of consumption device 116. The services offered by asset portfolio manager 120 may include application services. Application services may be provided by asset portfolio manager 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in asset portfolio manager 120, which may be implemented as a cloud infrastructure system. Users can acquire the application services without the need for customers to purchase separate licenses and support. Various different SaaS services may be provided. Users operating consumption device 116 may in turn utilize one or more applications to interact with asset portfolio manager 120 to utilize the services provided by subsystems and/or modules of asset portfolio manager 120.

Asset portfolio manager 120 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in asset portfolio manager 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some embodiments, computer-readable storage media may be configured to protect a computer from an electronic communication containing malicious code. The computer-readable storage media may include instructions stored thereon, that when executed on a processor, perform the operations described herein.

System 200 may also include or be coupled to one or more data sources, which may be implemented using any type of persistent storage device, such as a memory storage device or other non-transitory computer readable storage medium. In some embodiments, local storage may include or implement one or more databases (e.g., a document database, a relational database, or other type of database), one or more file stores, one or more file systems, or combinations thereof. For example, system 200 may be coupled to or may include one or more content sources 208 or data repositories such as an asset store 102. The asset store 102 may be accessed through a third party, in an embodiment. Examples of repository systems include, without limitation, GitHub® and Apache Subversion® (SVN). The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources may be accessible by asset portfolio manager 120 using network 210.

System 200 may also include or be coupled to additional storage, which may be implemented using any type of persistent storage device, such as a memory storage device or other non-transitory computer readable storage medium. In some embodiments, local storage may include or implement one or more databases (e.g., a content database, a relational database, an unstructured database, or other type of database), one or more file stores, one or more file systems, or combinations thereof. For example, system 200 may be coupled to or may include one or more data stores. Data stores may be included in or accessible by an asset portfolio manager 120. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The asset store 102 may be a network-accessible store accessible by asset portfolio manager 120 using network 210.

The asset portfolio manager 120 may include other functionality described in related applications, including "Presentation of Digital Media Assets Based on Assessed Value," U.S. Published Patent Application No. 2019/0043114, filed on Aug. 4, 2018 and "Digital Content Curation and Distribution System and Method," U.S. Pat. No. 8,635,220, filed on Apr. 20, 2012, both hereby incorporated by reference.

A communications interface 212 enables data to be exchanged with the asset portfolio manager 120 via the network 210, in an embodiment. For example, the asset portfolio manager 120 may communicate data with a content provider 104 through an application programming interface (API) 222 and the communications interface 212. As another example, information including a set of recommended assets may be shared with the content provider 104 through another API. Further, consumption data 118, as illustrated in FIG. 1, may be received from the consumption device 116 through an API using the communications interface 212, in an embodiment, through the content provider 104. As another example, if the asset portfolio manager 120 is integrated with a content provider 104, the communications interface 212 may provide the set of recommended assets from the asset store 102 to the consumption device 116. The communications interface 212 may provide data through one or more web servers, in one embodiment.

A taxonomy traversal analyzer 216 determines a traversal cost score between two nodes of a category taxonomy tree. As described above, once a category taxonomy tree is generated for an asset portfolio, the taxonomy traversal analyzer 216 generates a traversal cost for every pair of nodes in the category taxonomy tree. The traversal costs for the pairs of nodes in the category tree may be normalized using the longest path between two nodes, in one embodiment, to generate a similarity metric based on the category taxonomy tree. The similarity metric between two nodes in the category taxonomy tree is a real number between zero and one, and the similarity metric is one if the first viewed category node is the same as the last viewed category node. In one embodiment, a drift radius may be implemented to limit recommendations to pairs having a distance of less than a pre-determined threshold. The term "drift" refers to the movement from the initial category to a different category. This type of data pruning enables better recommendations that allow for less drift away from the initial category. The traversal cost may be stored in a category taxonomy data store 124, in one embodiment.

A category taxonomy data store 124 stores a known hierarchical taxonomy that describes an asset portfolio as a category tree of nodes. The list of nodes may be stored in the category taxonomy data store 124 and may include an associated asset group identifier, a customer identifier, a node name, a node type, and a computed depth characteristic, in one embodiment.

A recommendation engine 106 generates a set of recommended assets for presentation to a viewing user operating a consumption device 116. The set of recommended assets is generated using a weighted linear combination of metrics, including the similarity metric based on the category taxonomy tree described above, as well as a category transition history metric generated by the transition data analyzer 224 and a randomized data value generated by the randomized generator 126. In one embodiment, the weights in the linear combination are determined by a weighted score generator 218. In another embodiment, the weights are determined by administrators of the asset portfolio manager 120.

An action logger 214 stores actions taken by a consumption device 116 after presentation of the set of recommended assets, in an embodiment. The consumption device 116 operated by a viewing user may select one of the set of recommended assets to view, causing the asset to play on the consumption device 116. Upon completion of viewing the asset, such as a video, audio, or other digital media file, the consumption device 116 can indicate that a view has been completed (e.g., view complete). Other actions that may be logged include a selection of a thumbs up or a thumbs down, indicating user feedback on the viewed asset. Additionally, further actions may include a bounce (e.g., the user leaving the web site or closing the session), a skip (e.g., the user skipping to the next digital media asset in the playlist), or a hop (e.g., the user selects a different digital media asset in the ordered set or playlist). The action logger 214 stores the action taken associated with a category transition in the transition data store 110.

A transition data analyzer 224 receives data associated with category transitions based on the consumption of assets recommended to consumption devices 116 in the system 200. The transition data is aggregated for each pair of nodes in the category taxonomy tree for each customer of the asset portfolio manager 120, in one embodiment. The aggregated transition data is stored in the transition data store 110, in an embodiment. Other information may be determined based on the aggregated transition data, such as a success rate for completed views of a pair of category nodes. For example, suppose that there were 31 views of assets associated with a category transition from "gardening" to "plumbing" in the example category transition tree described above with respect to FIG. 1B. There may be additional transition data stored in the transition data store 110 indicating the number of completed views, the number of bounces (e.g., the viewing user closes the session), skips away (e.g., the viewing user skips the recommended asset), follow on views (e.g., the number of follow-on views that occur after the viewing user views the recommended asset), drop offs (e.g., the viewing user completes viewing of the recommended asset but no follow on view in session), thumbs down (e.g., the number of thumbs down actions taken associated with the transition), thumbs up (e.g., the number of thumbs up actions taken associated with the transition) and so on. These actions are captured by the action logger 214 described above. The number of completed views divided by the number of views aggregated over a time period discounted by a decay factor that prioritizes more recent transition data may be calculated by the transition data analyzer 224, in an embodiment, to generate a portion of the composite score used to rank the pairs of category nodes. In other embodiments, different statistical analysis may be generated by the transition data analyzer 224 using the transition data stored in the transition data store 110, alone and/or in combination with other data accessible by the asset portfolio manager 120. In one embodiment, a historical average views, bounces, and retention rate by category and day of week may be determined by the transition data analyzer 224. In another embodiment, transition data may be aggregated for any date window for third party data category transition monetization purposes.

A randomized data generator 126 uses known techniques to generate randomized data values for the pairs of category nodes in the transition data store 110 and/or category taxonomy data store 124. The randomized data value generated by the randomized data generator 126 may be used as part of a composite score to rank the pairs of category nodes by the recommendation engine 106.

A weighted score generator 218 determines a weighted composite score to rank the pairs of category nodes in the category transition tree associated with an asset portfolio, in an embodiment. Weights are associated with the components that form the composite score in a linear combination. The optimal value of the weight can be determined in different ways. In one embodiment, machine learning may be used to determine the optimal value of a weight that places a higher value on observed data from category transitions, as aggregated by the transition data analyzer 224, versus the taxonomy traversal data analyzed by the taxonomy traversal analyzer 216. Machine learning may be used to determine the weight using the success rate of category transitions. In another embodiment, weights may be explicitly set by administrators of the asset portfolio manager 120 for each customer. In a further embodiment, the weight may be based on data at the transition level, meaning that as more data is gathered for transitions, the more weight is assigned to that component of the composite score. The weighted score generator 218 uses the weight to compute a composite score for the transitions between the pairs of nodes in the category taxonomy tree in response to a query, in one embodiment. In this way, the weighted score generator 218 relies on the most recent category transition data in the transition store 110 because, in one embodiment, twenty-one days of history are used and weighted based on their age in days using a degrade function when using category transition data in the transition data store 110. For example, upon request for a recommended asset, the weighted score generator 218 may execute a query to compute composite scores of pairs of category nodes. The composite scores may then be used by the recommendation engine 106 to determine a set of recommended assets for consumption by the consumption device 116.

Business criteria may be inputted by administrators of the asset portfolio manager 120, through a user interface in an application 206 operating on a consumption device 116, through an application program interface 222 on a content provider 104, or through an application connected to the asset portfolio manager 120 through the communications interface 212, in various embodiments. Such business criteria may include explicit setting of a weight for a particular customer and creation of a drift radius to set a lower bound on allowable data-driven drift to be included in the composite score. The drift radius may be set at a customer level or an asset group level, in an embodiment.

Additional business criteria may include "constraints" asset groups in which administrators may specify where no path exists from a constrained category to a non-constrained category, a path does exist among the constrained categories such that it is possible to move from one constrained category to another, and a path exists from every non-constrained category to a constrained category. As described above with respect to FIG. 1B, a "constraints" asset group node 140 includes constrained category nodes 142, 144, and 146 of "1-3 min," "4-6 min," and "7-10 min," respectfully. Business criteria may be inputted by administrators of the asset portfolio manager 120 to generate these special rules for the constrained category nodes 142, 144, and 146. This accomplishes the same effect of prohibiting categories by severing arcs using the constrained category node technique. The arc weight for all paths that connect to a target node may be set to infinite to make that target node a "prohibited" category node, for example. In other words, the severing of arcs is accomplished by setting traversal cost to a very large number, such as infinity, and disallowing any pairing where the traversal cost is equal to that large number.

The historical statistical rates calculator 220 is used to determine historical statistical rates for categories in relation to a target asset in a campaign. As mentioned above, a historical yield rate may be computed based on data included in the transition data store 110. For example, 100,000 category starts in a news category may be associated with a yield rate of 0.2 for the target asset. This means that only 20,000 views of the target asset are completed based on the 100,000 beginning category starts. The historical statistical rates calculator 220 may compute a historical follow-on rate beyond position k based on the data included in the transition data store 110, in an embodiment.

3.0 Example Embodiments

Figure 3:
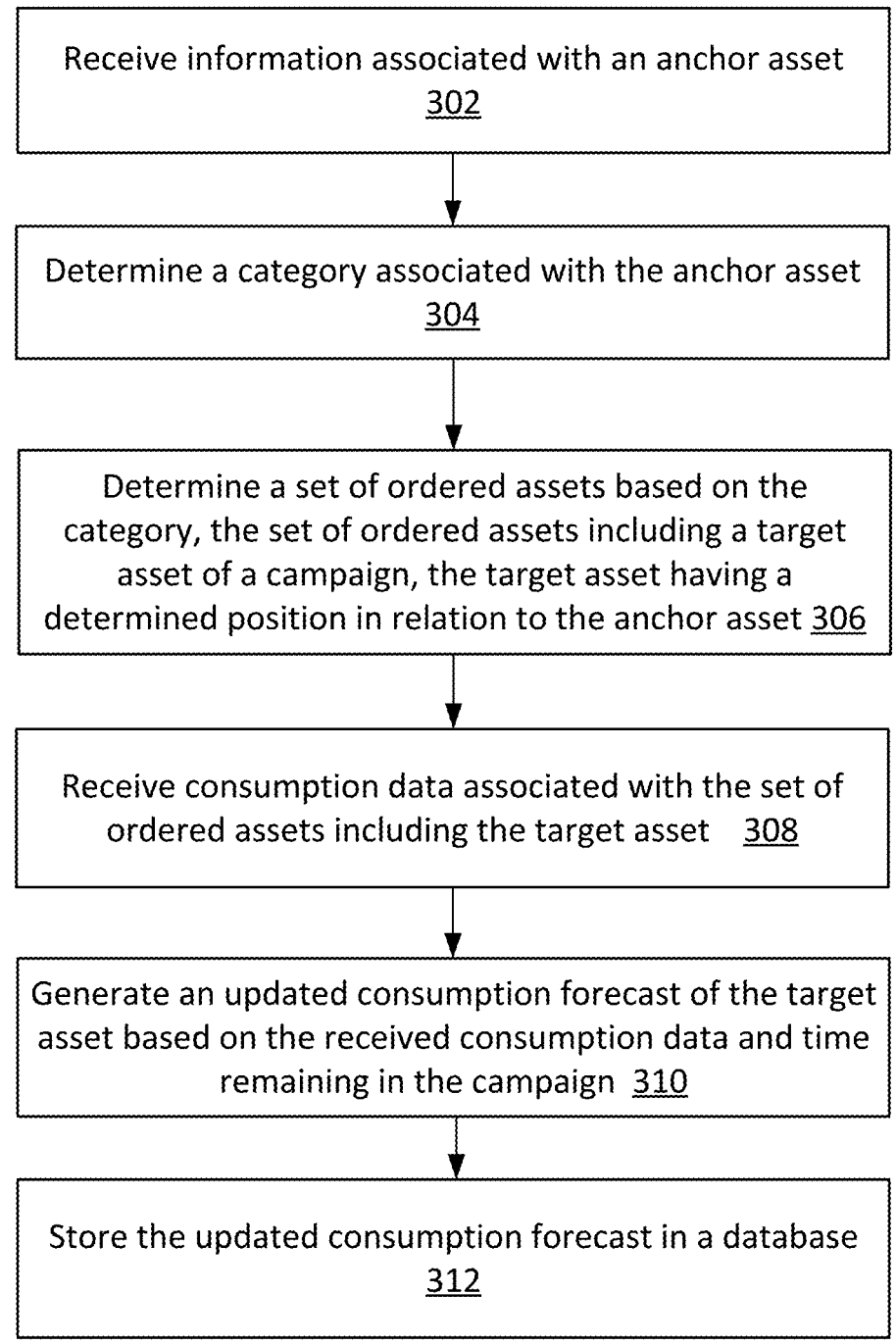
FIG. 3 illustrates an example process flow.

FIG. 3 illustrates an example process flow that may be implemented by a computing system (or device) as described herein. In block 302, an asset portfolio manager 120 (e.g., 120 of FIG. 1A, etc.) receives information associated with an anchor asset. In an embodiment, the information associated with the anchor asset may be retrieved from the asset store 102 by the asset portfolio manager 120. In another embodiment, the information about the anchor asset may be received by a process, method, or technique connected to the asset portfolio manager 120 and communicated to the asset portfolio manager 120 through the communications interface 212. In a further embodiment, the information about the anchor asset may be received by the asset portfolio manager 120 via consumption data 118 from the consumption device 116, such as identifying information based on what was consumed by the viewing user.

In block 304, the asset portfolio manager 120 (e.g., 120 of FIG. 1A, etc.) determines a category associated with the anchor asset. In an embodiment, the category associated with the anchor asset may be determined from the asset store 102. For example, the category associated with the anchor asset may include a news category.

In block 306, a set of ordered assets may be determined based on the category, the set of ordered assets including a target asset of a campaign, and the target asset having a determined position in relation to the anchor asset. In an embodiment, the set of ordered assets are assembled as a list of pointers to the actual files (e.g., .MOV, .MP4, .GIF, etc.) stored on a content delivery network (CDN) file server. For video files, a computer file format for a multimedia playlist, such as Moving Picture Experts Group Audio Layer 3 (M3U) Uniform Resource Locator, may be used. This determination may be made by the target asset presenter 190 (e.g., 190 of FIG. 1A, etc.) as well as other techniques described with respect to the asset portfolio manager 120. For example, the set of ordered assets may be determined based on the traversal cost of traversing the taxonomy tree, including the directional weights mentioned above, in one embodiment and the historical yield and follow-on rates based on starting category. The campaign may specify the fill rate and position of the target asset, in an embodiment. This may be set through an API connected to the target presenter 190 and/or the asset portfolio manager 120, in an embodiment. Assets are retrieved when the consumption device gathers a list of metadata associated with each asset from the CDN file server, in one embodiment. Metadata fields include, for example, file_id (image), file_id (asset) title, image file address (thumbnail), and/or asset file address. The consumption device requests files that are delivered by the CDN file server, based on the metadata file addresses, back to the consumption device. For some file types, the file is partitioned, or chopped up, into smaller packets by the CDN file server and reassembled at the user device for consumption.

In block 308, consumption data associated with the set of ordered assets including the target asset is received. For example, the actual yield rate and follow-on rate may be included in the consumption data reported from the consumption device 116 to the asset portfolio manager 120 through the network(s) 210.

In block 310, an updated consumption forecast of the target asset is generated based on the received consumption data and time remaining in the campaign. For example, estimates may be revised to reflect category to target asset transitions. The forecast of experience starts may be updated to reflect the remainder of time in the campaign (w) such that the update is reflected as w*initial_prob+(1−w)*campaign_prob, where initial_prob is the initialized selection probability and the campaign_prob is the new updated probability using the received consumption data. In block 312, the updated consumption forecast is stored in a database accessible by the asset portfolio manager 120.

Figure 4:
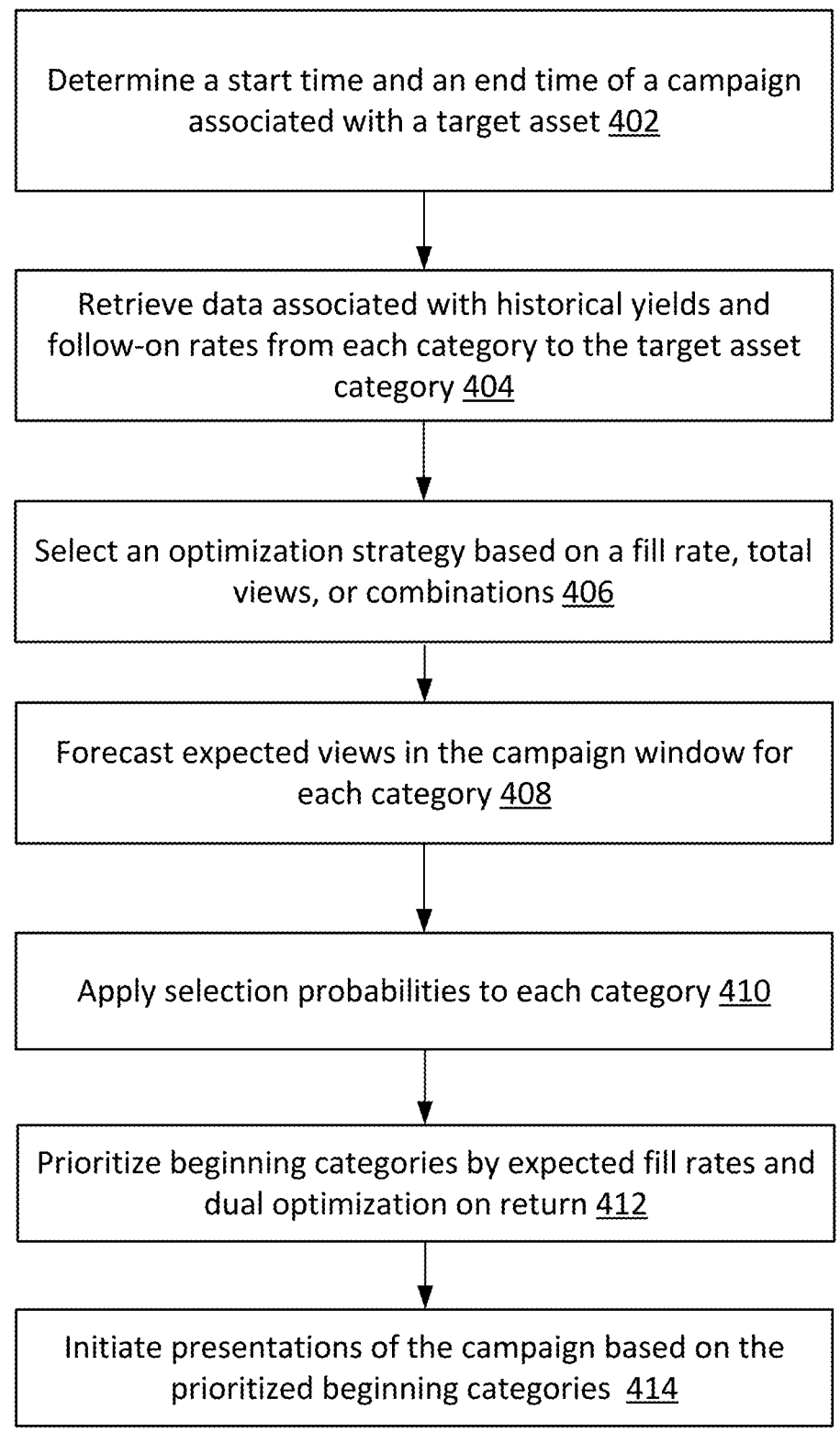
FIG. 4 illustrates an example process flow.

FIG. 4 illustrates another example process flow that may be implemented by a computing system (or device) as described herein. In block 402, a start time and an end time of a campaign associated with a target asset is determined by the asset portfolio manager 120 (e.g., 120 of FIG. 1A, etc.). For example, a start time and an end time of a campaign may be included in a request to present the target asset at the target asset presenter 190. Additional information may include a target fill for the target asset during the campaign.

In block 404, data associated with historical yields and follow-on rates from each category to the target asset category may be retrieved by the asset portfolio manager 120. In an embodiment, a historical statistical rate calculator 220 may be used to determine the rates based on category transition data stored in the transition data store 110. These rates may be stored as data in the transition data store 110.

In block 406, an optimization strategy is selected based on a fill rate, total views or combinations by the asset portfolio manager 120. In one embodiment, a recommendation engine 106 may be used to select the optimization strategy. A composite score may be weighted such that one or more of a fill rate, a number of total views, or a randomized data value is used in linear combination to generate the composite score. The composite scores may be computed, in part, by executing a query of the category taxonomy data store 124 and/or the transition data store 110. Additionally, the randomness factor may be computed and/or generated by the randomized data generator 126. The weighted score generator 218 may generate the composite scores, in an embodiment, that are used to generate the set of recommended assets by the recommendation engine 106. In another embodiment, the return on presentation for each starting category may be estimated based on historical yield and follow-on rates. Using the return on presentation, the optimal starting categories may be selected.

In block 408, the number of expected views in the campaign window for each category may be forecasted by the asset portfolio manager 120. This estimated number of views of the target asset based on the starting category may be determined by the historical yield rates for each category. For example, if the historical yield rate for news category starts is 0.20, then for 100,000 starts, the expected fills is 20,000. FIGS. 5A-5D illustrate example data tables of an example target asset campaign that may be implemented by a computing system (or device) as described herein. FIG. 5A illustrates an example data table 500 having rows 502, 504, 506, 508, 510, and 512 corresponding to beginning categories of assets, such as news, sports, television, food, science, and politics. As shown in FIG. 5A, the total number of expected fills for the different beginning categories totals 74,000. This provides an average historical yield rate of 0.247 (74,000 divided by 300,000 expected starts). Taking the target fill of 40,000 divided by the historical yield rate of 0.247 results in the naïve expected presentations of 161,943. The naïve selection probability is then computed by taking the naïve expected presentations of 161,943 divided by the total expected starts of 300,000, resulting in 53.98%.

In block 410, selection probabilities are applied to each category. As shown in FIG. 5B, the selection probability of 53.98% is applied to each beginning category to show each number of presentations for each category that will lead to an expected target asset completed view. For example, for the news category as the beginning category, 53,981 presentations multiplied by the historical yield rate (0.2) will yield 10,797 expected fills (53,981*0.2=10,797).

In block 412, beginning categories are prioritized by expected fill rates and dual optimization on return. As shown in FIG. 5C, certain beginning categories are prioritized by expected fill rate to reduce the presentation burden. The dual optimization on return refers to further optimizing on the expected follow-on views after the target asset has been viewed, as computed in FIG. 5B. Thus, three categories in the example have been prioritized by expected fill rates in FIG. 5C. Then, two categories are further prioritized by dual objectives in FIG. 5D.

In block 414, presentations of the campaign are initiated based on the prioritized beginning categories. In the example illustrated in FIG. 5D, the beginning categories of sports and science are prioritized. Thus, the asset portfolio manager 120 may initiate the presentations of the target asset in the set of ordered assets with the beginning categories of sports and science to achieve the target fill of 40,000 within the campaign time window.

In some embodiments, to avoid problems with low-quality or missing data for some transitions, more data can be collected during the campaign. For example, if there is insufficient data to suggest or recommend a transition to the target asset from a category (e.g., Category X→Target Asset), this means historical data is lacking to forecast whether the transition would or would not be successful. A reserve percentage, R, could be set and applied to every experience, ignoring past data. By setting a reserve value, the system forces some transitions to happen (e.g., Category X→Target Asset) such that enough data is gathered to determine the success rate of the transition. Enough data means that the sample size of historical transitions (e.g., from Category X to Target Asset) is sufficiently large for the portfolio manager to have confidence in the results. Until then, that specific transition data (the reserve pool) is left out of the optimization so the expected successful transitions outside of Category X are not contaminated by weak data. In other words, the optimization would be applied to the experiences outside the reserve pool. For example, if another category had low-quality or missing data for transitions to the target asset, such as an "outdoor" category, then a reserve percentage, R, may be set as 0.25 and applied to every experience. This means that 25% of the campaign would be forced to transition from the "outdoor category" to the target asset in order to gather additional observed data related to the success or failure of that specific transition. As another example, suppose there is only one historical observation from Category X→Target Asset and it was successful (100% success) but all other (not category X) categories (A, B, C, . . . , W, Y, Z) have between 50-10000 observations with success rates of 50-90%. If the system had allowed the 1 observation transition in the optimization, that transition would be the preferred transition because of its 100% success rate being greater than the other transitions. Instead, the system may, in an embodiment, set a quality threshold (e.g., a minimum of 50 observations) and a reserve percentage R for the specific low historical observation transition (Category X→Target Asset). Then, the system would collect an additional 49 observations to meet the minimum (n=50) number of 50 observations and then include that transition data in the optimization based on its higher-quality success rate. In other embodiments, business rules may be developed around the specific low historical observation transition, such as if the n=1 case leads to a 0% success rate, the transition could not be shown in the future and the system could intentionally fail to collect more data. This approach may fail to detect a strong transition. In another embodiment, if the n=1 case leads to superior success rate with no reserve in place and the transition is included in the optimization, the system may still collect the additional n=49 observations in a non-optimal way by taking presentation of target assets in other categories away and replacing them with the Category X-Target Asset transition. This is non-optimal because the presentation of target assets in other categories may yield higher success rates over time, in various embodiments.

In another embodiment, a campaign may include multiple target assets. For example, a campaign for a boutique hotel may include multiple target assets that have different returns because the target assets belong to different categories. Returns can be computed for each target asset and the selection probabilities that result from the highest expected return can be applied. Then, probabilities for remaining target assets can be recomputed because some or all of the available expected starts are reserved for the first target assets. In this way, the multi-asset campaigns can be applied as a vector of assets, repeating this process until all target assets have been assigned selection probabilities.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
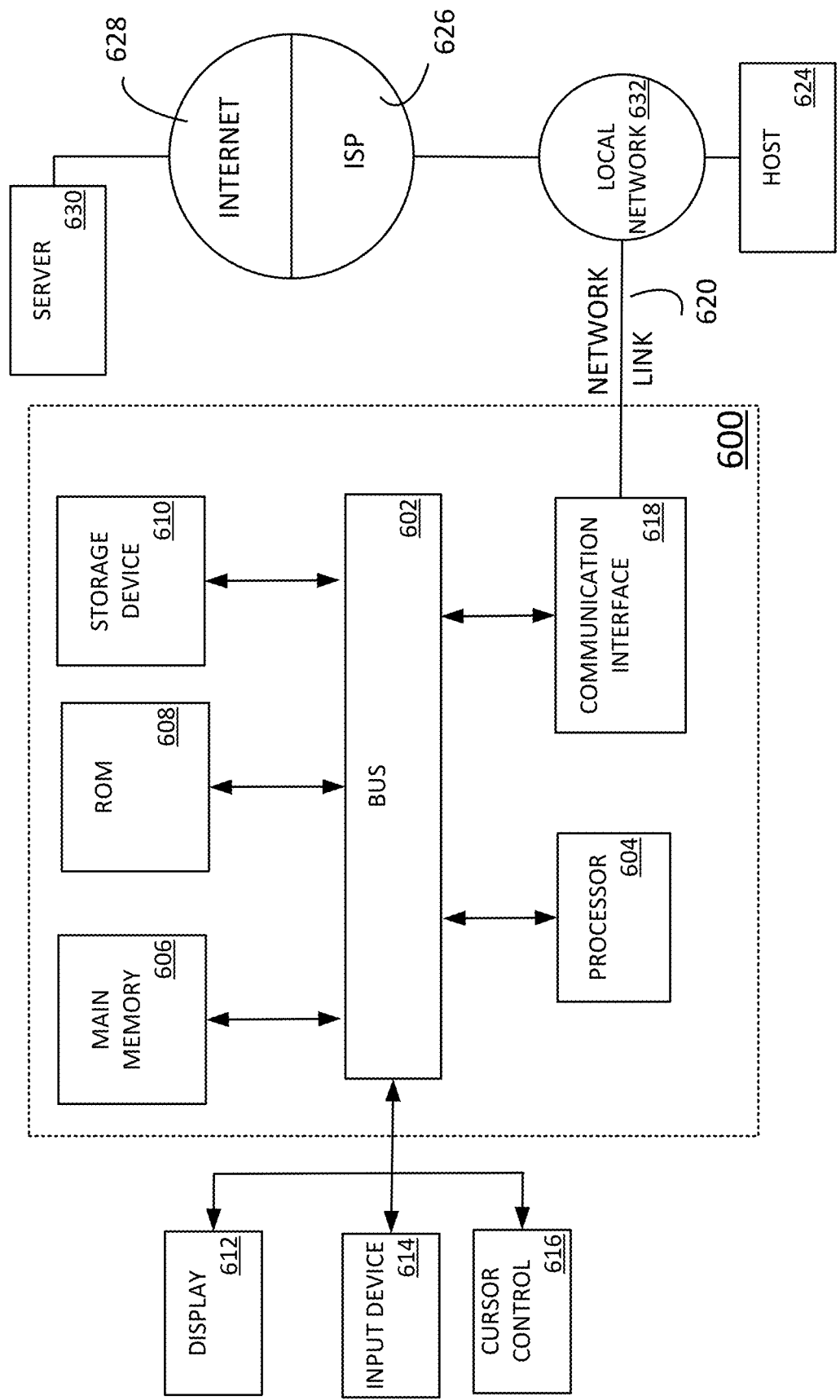
FIG. 6 illustrates an example hardware platform on which a computer or a computing device as described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is device-specific to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using device-specific hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
receiving, by one or more processors of an electronic asset server from a digital content provider, information identifying that a user associated with a consumption user device is included in a campaign associated with a target electronic asset;
in response to determining, by the one or more processors of the electronic asset server, that the user selecting a first electronic asset from a plurality of electronic assets in an electronic asset portfolio is included in the campaign, wherein the first electronic asset is associated with an electronic asset category, performing:
  accessing, by the one or more processors of the electronic asset server, a category taxonomy data store to retrieve inter-category traversal costs between electronic asset categories;
  accessing, by the one or more processors of the electronic asset server, a transition data store to retrieve historical statical yield data associated with the electronic asset category in relation to the target electronic asset;
  generating, by the one or more processors of the electronic asset server and based at least in part on the inter-category traversal costs and the historical statistical yield data, a set of sequentially ordered electronic assets including the target electronic asset following the first electronic asset;

determining, by the one or more processors of the electronic asset server, a uniform resource locator (URL) for each electronic asset in the set of sequentially ordered electronic assets;

creating, by the one or more processors of the electronic asset server and for the consumption user device, an electronic asset playlist file comprising the URL for said each electronic asset in the set of sequentially ordered electronic assets arranged in the order of the set of sequentially ordered electronic assets;

sending, by the one or more processors of the electronic asset server to the consumption user device, the electronic asset playlist file.

2. The method of claim 1, further comprising:

receiving, by the one or more processors of the electronic asset server, consumption data associated with the set of sequentially ordered electronic assets presented by the consumption user device;

generating, by the one or more processors of the electronic asset server, an updated forecast of expected fills associated with the category of the first electronic asset based on the consumption data;

storing, by the one or more processors of the electronic asset server, the updated forecast of expected fills associated with the category of the first electronic asset in a database accessible by the electronic asset server;

assigning an initial selection probability to a subset of the plurality of electronic assets, the subset of the plurality of electronic assets sharing the same category designation;

updating the initial selection probability of an electronic asset of the plurality of electronic assets based on consumption data associated with the electronic asset and the target electronic asset.

3. The method of claim 1, further comprising:

generating a reserve pool of transitions, the reserve pool of transitions comprising a predetermined percentage of transitions in a campaign associated with a specified category to the target electronic asset;

gathering observed success rate associated with the transitions in the campaign including the specified category to the target electronic asset;

responsive to the target electronic asset not being included in the reserve pool, based on at least one of a fill rate and total views of the target electronic asset, using a recommendation engine within the electronic asset server and data associated with historical yields and follow-on rates from each category other than the specified category to the category of the target electronic asset to generate one or more recommended beginning categories associated with the target electronic asset, wherein the one or more beginning categories do not include the specified category.

4. The method of claim 1, further comprising:

determining a campaign window, the campaign window comprising a start time and an end time of the campaign associated with the target electronic asset;

retrieving data associated with historical yields and follow-on rates from each category to the category of the target electronic asset;

using a recommendation engine within the electronic asset server and the retrieved data associated with historical yields and follow-on rates from each category to the category of the target electronic asset to generate one or more recommended beginning categories associated with the target electronic asset based on at least one of a fill rate and total views;

generating a forecast of expected views in the campaign window associated with each category;

applying one or more selection probabilities to each category;

calculating a dual optimization on return metric based on the forecast of expected views combined with a number of expected follow-on views divided by an expected number of starts associated with each category;

prioritizing beginning categories by expected fill rates and the dual optimization on return metric associated with each category;

causing presentations of the campaign based on the prioritized beginning categories.

5. The method of claim 4, wherein a beginning category comprises the category of the first electronic asset.

6. The method of claim 1, wherein the consumption user device presents the target electronic asset in the campaign that starts with one or more anchor electronic assets in one or more beginning categories.

7. The method of claim 4, wherein the number of expected follow-on views after the target electronic asset has been viewed is calculated based on a historical follow-on rate beyond a position of the target electronic asset.

8. A system, comprising:

one or more computing processors;

one or more non-transitory computer readable media storing a program of instructions that is executable by the one or more computing processors to perform:

receiving, by one or more processors of an electronic asset server from a digital content provider, information identifying that a user associated with a consumption user device is included in a campaign associated with a target electronic asset;

in response to determining, by the one or more processors of the electronic asset server, that the user selecting a first electronic asset from a plurality of electronic assets in an electronic asset portfolio is included in the campaign, wherein the first electronic asset is associated with an electronic asset category, performing:

accessing, by the one or more processors of the electronic asset server, a category taxonomy data store to retrieve inter-category traversal costs between electronic asset categories;

accessing, by the one or more processors of the electronic asset server, a transition data store to retrieve historical statical yield data associated with the electronic asset category in relation to the target electronic asset;

generating, by the one or more processors of the electronic asset server and based at least in part on the inter-category traversal costs and the historical statistical yield data, a set of sequentially ordered electronic assets including the target electronic asset following the first electronic asset;

determining, by the one or more processors of the electronic asset server, a uniform resource locator (URL) for each electronic asset in the set of sequentially ordered electronic assets;

creating, by the one or more processors of the electronic asset server and for the consumption user device, an electronic asset playlist file comprising the URL for said each electronic asset in the set of sequentially ordered electronic assets arranged in the order of the set of sequentially ordered electronic assets;

sending, by the one or more processors of the electronic asset server to the consumption user device, the electronic asset playlist file.

9. The system of claim 8, which when executed by the one or more processors cause further performance of:

receiving, by the one or more processors of the electronic asset server, consumption data associated with the set of sequentially ordered electronic assets presented by the consumption user device;

generating, by the one or more processors of the electronic asset server, an updated forecast of expected fills associated with the category of the first electronic asset based on the consumption data;

storing, by the one or more processors of the electronic asset server, the updated forecast of expected fills associated with the category of the first electronic asset in a database accessible by the electronic asset server;

assigning an initial selection probability to a subset of the plurality of electronic assets, the subset of the plurality of electronic assets sharing the same category designation;

updating the initial selection probability of an electronic asset of the plurality of electronic assets based on consumption data associated with the electronic asset and the target electronic asset.

10. The system of claim 8, which when executed by the one or more processors cause further performance of:

generating a reserve pool of transitions, the reserve pool of transitions comprising a predetermined percentage of transitions in a campaign associated with a specified category to the target electronic asset;

gathering observed success rate associated with the transitions in the campaign including the specified category to the target electronic asset;

responsive to the target electronic asset not being included in the reserve pool, based on at least one of a fill rate and total views of the target electronic asset, using a recommendation engine within the electronic asset server and data associated with historical yields and follow-on rates from each category other than the specified category to the category of the target electronic asset to generate one or more recommended beginning categories associated with the target electronic asset, wherein the one or more beginning categories do not include the specified category.

11. The system of claim 8, which when executed by the one or more processors cause further performance of:

determining a campaign window, the campaign window comprising a start time and an end time of the campaign associated with the target electronic asset;

retrieving data associated with historical yields and follow-on rates from each category to the category of the target electronic asset;

using a recommendation engine within the electronic asset server and the retrieved data associated with historical yields and follow-on rates from each category to the category of the target electronic asset to generate one or more recommended beginning categories associated with the target electronic asset based on at least one of a fill rate and total views;

generating a forecast of expected views in the campaign window associated with each category;

applying one or more selection probabilities to each category;

calculating a dual optimization on return metric based on the forecast of expected views combined with a number of expected follow-on views divided by an expected number of starts associated with each category;

prioritizing beginning categories by expected fill rates and the dual optimization on return metric associated with each category;

causing presentations of the campaign based on the prioritized beginning categories.

12. The system of claim 11, wherein a beginning category comprises the category of the first electronic asset.

13. The system of claim 8, wherein the consumption user device presents the target electronic asset in the campaign that starts with one or more anchor electronic assets in one or more beginning categories.

14. The system of claim 11, wherein the number of expected follow-on views after the target electronic asset has been viewed is calculated based on a historical follow-on rate beyond a position of the target electronic asset.

15. One or more non-transitory computer-readable storage media, storing one or more sequences of instructions, which when executed by one or more processors cause performance of:

receiving, by one or more processors of an electronic asset server from a digital content provider, information identifying that a user associated with a consumption user device is included in a campaign associated with a target electronic asset;

in response to determining, by the one or more processors of the electronic asset server, that the user selecting a first electronic asset from a plurality of electronic assets in an electronic asset portfolio is included in the campaign, wherein the first electronic asset is associated with an electronic asset category, performing:

accessing, by the one or more processors of the electronic asset server, a category taxonomy data store to retrieve inter-category traversal costs between electronic asset categories;

accessing, by the one or more processors of the electronic asset server, a transition data store to retrieve historical statical yield data associated with the electronic asset category in relation to the target electronic asset;

generating, by the one or more processors of the electronic asset server and based at least in part on the inter-category traversal costs and the historical statistical yield data, a set of sequentially ordered electronic assets including the target electronic asset following the first electronic asset;

determining, by the one or more processors of the electronic asset server, a uniform resource locator (URL) for each electronic asset in the set of sequentially ordered electronic assets;

creating, by the one or more processors of the electronic asset server and for the consumption user device, an electronic asset playlist file comprising the URL for said each electronic asset in the set of sequentially ordered electronic assets arranged in the order of the set of sequentially ordered electronic assets;

sending, by the one or more processors of the electronic asset server to the consumption user device, the electronic asset playlist file.

16. The one or more non-transitory computer-readable storage media claim 15, which when executed by the one or more processors cause further performance of:

receiving, by the one or more processors of the electronic asset server, consumption data associated with the set of sequentially ordered electronic assets presented by the consumption user device;

generating, by the one or more processors of the electronic asset server, an updated forecast of expected fills associated with the category of the first electronic asset based on the consumption data;

storing, by the one or more processors of the electronic asset server, the updated forecast of expected fills associated with the category of the first electronic asset in a database accessible by the electronic asset server;

assigning an initial selection probability to a subset of the plurality of electronic assets, the subset of the plurality of electronic assets sharing the same category designation;

updating the initial selection probability of an electronic asset of the plurality of electronic assets based on consumption data associated with the electronic asset and the target electronic asset.

17. The one or more non-transitory computer-readable storage media claim 15, which when executed by the one or more processors cause further performance of:

generating a reserve pool of transitions, the reserve pool of transitions comprising a predetermined percentage of transitions in a campaign associated with a specified category to the target electronic asset;

gathering observed success rate associated with the transitions in the campaign including the specified category to the target electronic asset;

responsive to the target electronic asset not being included in the reserve pool, based on at least one of a fill rate and total views of the target electronic asset, using a recommendation engine within the electronic asset server and data associated with historical yields and follow-on rates from each category other than the specified category to the category of the target electronic asset to generate one or more recommended beginning categories associated with the target electronic asset, wherein the one or more beginning categories do not include the specified category.

18. The one or more non-transitory computer-readable storage media claim 15, which when executed by the one or more processors cause further performance of:

determining a campaign window, the campaign window comprising a start time and an end time of the campaign associated with the target electronic asset;

retrieving data associated with historical yields and follow-on rates from each category to the category of the target electronic asset;

using a recommendation engine within the electronic asset server and the retrieved data associated with historical yields and follow-on rates from each category to the category of the target electronic asset to generate one or more recommended beginning categories associated with the target electronic asset based on at least one of a fill rate and total views;

generating a forecast of expected views in the campaign window associated with each category;

applying one or more selection probabilities to each category;

calculating a dual optimization on return metric based on the forecast of expected views combined with a number of expected follow-on views divided by an expected number of starts associated with each category;

prioritizing beginning categories by expected fill rates and the dual optimization on return metric associated with each category;

causing presentations of the campaign based on the prioritized beginning categories.

19. The one or more non-transitory computer-readable storage media claim 18, wherein a beginning category comprises the category of the first electronic asset.

20. The one or more non-transitory computer-readable storage media claim 15, wherein the consumption user device presents the target electronic asset in the campaign that starts with one or more anchor electronic assets in one or more beginning categories.

* * * * *